United States Patent [19]

Inaba et al.

[11] Patent Number: 4,489,821
[45] Date of Patent: Dec. 25, 1984

[54] WORKPIECE FEEDER

[75] Inventors: Hajimu Inaba, Hino; Nobutoshi Torii, Hachioji, both of Japan

[73] Assignee: Fujitsu Fanuc Limited, Tokyo, Japan

[21] Appl. No.: 390,658

[22] Filed: Jun. 21, 1982

[30] Foreign Application Priority Data

Jun. 29, 1981 [JP] Japan .................................. 56-99741

[51] Int. Cl.³ ............................................. B65G 37/00
[52] U.S. Cl. ..................................... 198/472; 198/345; 198/648; 414/223; 414/417
[58] Field of Search ............... 198/339, 345, 656, 482, 198/484, 796, 341, 472; 414/47, 223, 564, 609, 416, 417, 28, 45, 100, 99; 187/24, 25, 34, 36, 32; 318/265

[56] References Cited

U.S. PATENT DOCUMENTS

| | | | |
|---|---|---|---|
| 1,989,039 | 1/1935 | Geyer | 198/345 X |
| 2,611,473 | 9/1952 | Reynolds | 198/648 |
| 2,895,567 | 7/1959 | Hall | 187/24 |
| 3,267,530 | 8/1966 | Buttkereit et al. | 414/28 X |
| 3,710,711 | 1/1973 | Boehm et al. | 198/482 X |
| 4,049,500 | 9/1977 | Kamm | 198/345 |
| 4,189,133 | 2/1980 | Arrasmith et al. | 414/100 X |

FOREIGN PATENT DOCUMENTS 2101097  1/1983  United Kingdom ................ 414/118

Primary Examiner—Robert J. Spar
Assistant Examiner—Jonathan D. Holmes
Attorney, Agent, or Firm—Armstrong, Nikaido, Marmelstein & Kubovcik

[57] ABSTRACT

An apparatus for feeding workpieces to a workpiece gripping position of a hand of an industrial robot, especially a workpiece feeder used for a limited axis robot, comprising a conveyor which is mounted on a table and has a plurality of pallets, the workpieces placed on the pallets moved intermittently to a predetermined area of the robot, characterized in that the table has a window, that each of the pallets comprises a lower plate having a central opening and an upper plate mounted on the lower plate, and that there is provided a lifting means movable vertically through the window in the table and the central opening in the lower plate, causing the upper plate to move and to lift the workpiece placed on the upper plate up to a workpiece gripping position of a hand of the robot.

5 Claims, 9 Drawing Figures

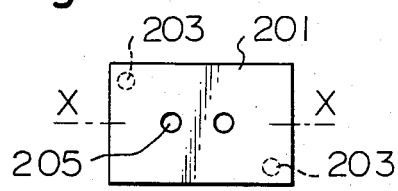
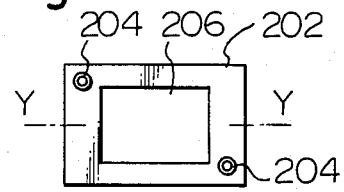
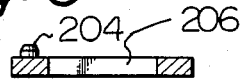
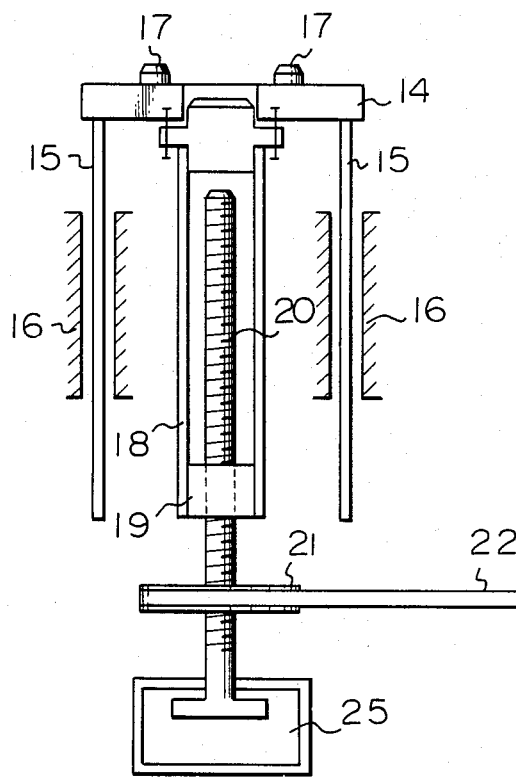

WORKPIECE FEEDER

BACKGROUND OF THE INVENTION

(1) Field of the Invention

The present invention relates to a workpiece feeder, more particularly to an apparatus for feeding workpieces to a workpiece gripping position of a hand of an industrial robot.

(2) Description of the Prior Art

In industrial robots used for machine tools or the like, the workpiece gripping position of the hand of the robot is adjusted by a combination of three motions, i.e., transverse motion along the horizontal axis, vertical motion along the vertical axis, and rotational motion around the horizontal or vertical axis.

A known workpiece feeder used for such robots, includes a frame, a table mounted on said frame, and an endless conveyor mounted on said table and having a plurality of movable pallets interspaced from each other at equal distances, said conveyor having at least one belt run portion extending over said table and adapted to move said pallets intermittently one by one under said predetermined area.

However, robots able to effect both motion along the horizontal axis and motion along the vertical axis are complicated in construction and expensive. In some cases, therefore, robots are used which are not able to effect motion along the horizontal axis or vertical axis (below, "limited axis robots"). If said conventional workpiece feeders are applied to such limited axis robots, they would not be able to carry workpieces to the workpiece gripping position of the robot hand. As of now, there have been no workpiece feeders able to be used for limited axis robots.

OBJECTS AND SUMMARY OF THE INVENTION

The present invention relates to a workpiece feeder for limited axis robots, especially robots not able to effect motion along the vertical axis.

The object of the present invention is to provide an apparatus for sucessively feeding required workpieces to a workpiece gripping position of a hand of said type of robot situated at a constant height.

Another object of the present invention is to provide an apparatus for successively feeding workpieces to a workpiece gripping position of a hand of a robot by detecting the workpiece gripping position of the hand of the robot, transferring workpieces to the required position, and stopping them precisely.

The present invention provides an apparatus for successively feeding workpieces to a predetermined area, typically the workpiece gripping position of a hand of an industrial robot, said apparatus including a frame, a table mounted on said frame, and an endless conveyor mounted on said table and having a plurality of movable pallets interspaced from each other at equal distances, said conveyor having at least one belt run portion extending over said table and adapted to move said pallets intermittently one by one under said predetermined area, characterized in that said table has a window aligned with said predetermined area, that each said pallets comprises a lower plate and an upper plate detachably mounted on said lower plate, said lower plate having a central opening, and that there is provided a lifting means movable vertically through said window in the table and said central opening in the lower plate to engage said upper plate from below, causing said upper plate to move and to lift a workpiece placed on said upper plate up to said workpiece gripping position of the robot.

When a workpiece feeder according to the present invention is used in combination with a limited axis robot, workpiece carrying pallets can be successively moved to and stopped directly under the workpiece gripping position of the hand of the robot; the workpiece carrying upper plates can be raised from this position by the lifting means, which rises vertically through said window in the table and said central opening in the lower plate, and can be stopped at the predetermined position; and the required workpieces can be fed to the workpiece gripping position of the hand of the robot.

Thus, according to the present invention, there is attained a workpiece feeder adapted to a robot not able to effect movement along the vertical axis.

According to a preferred embodiment of the present invention, there is further provided a workpiece feeder comprising a means which senses the positions of the upper ends of a plurality of workpieces stacked up on a pallet, signals from said sensing means stopping the rise of said lifting means, whereby a plurality of workpieces stacked up on one pallet can be fed one by one to the workpiece gripping position of the hand of the robot.

According to another preferred embodiment of the present invention, there is provided a workpiece feeder comprising a lifting means driven by a D.C. servomotor controlled by a predetermined program.

The use of workpieces feeders, according to these preferred embodiments, in combination with limited axis robots allows required workpieces, regardless of size or number, to be correctly and easily fed to the workpiece gripping position of the hand of the robot.

According to still another preferred embodiment of the present invention, said lifting means is provided with a brake, thereby allowing the lifting means to be quickly stopped at the predetermined position and allowing the required workpieces to be more correctly fed to the workpiece gripping position of the hand of the robot.

BRIEF DESCRIPTION OF THE DRAWINGS

FIG. 2 is a plane view of an upper plate of the pallet in the workpiece feeder shown in FIG. 1;

FIG. 3 is a cross-section taken along line X—X of FIG. 2;

FIG. 4 is a plane view of a lower plate of the pallet in the workpiece feeder shown in FIG. 1;

FIG. 5 is a cross-section taken along line Y—Y of FIG. 4;

FIG. 7 is an enlarged front view of a pallet-lifting means in the workpiece feeder shown in FIG. 6;

DETAILED DESCRIPTION OF THE PREFERRED EMBODIMENTS

The structure of the present invention will now be described with reference to a preferred embodiment illustrated in the accompanying drawings.

Figure 1:
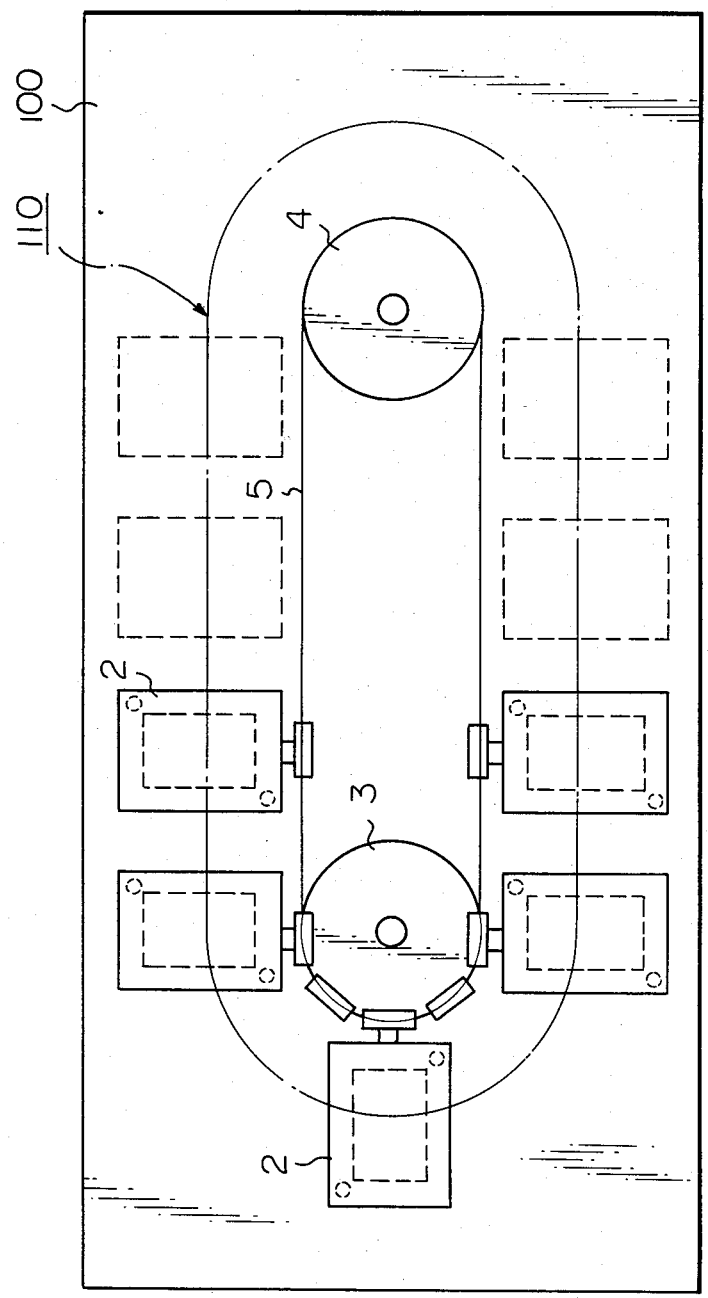
FIG. 1 is a general plane view of the workpiece feeder according to a preferred embodiment of the present invention.
Figure 6:
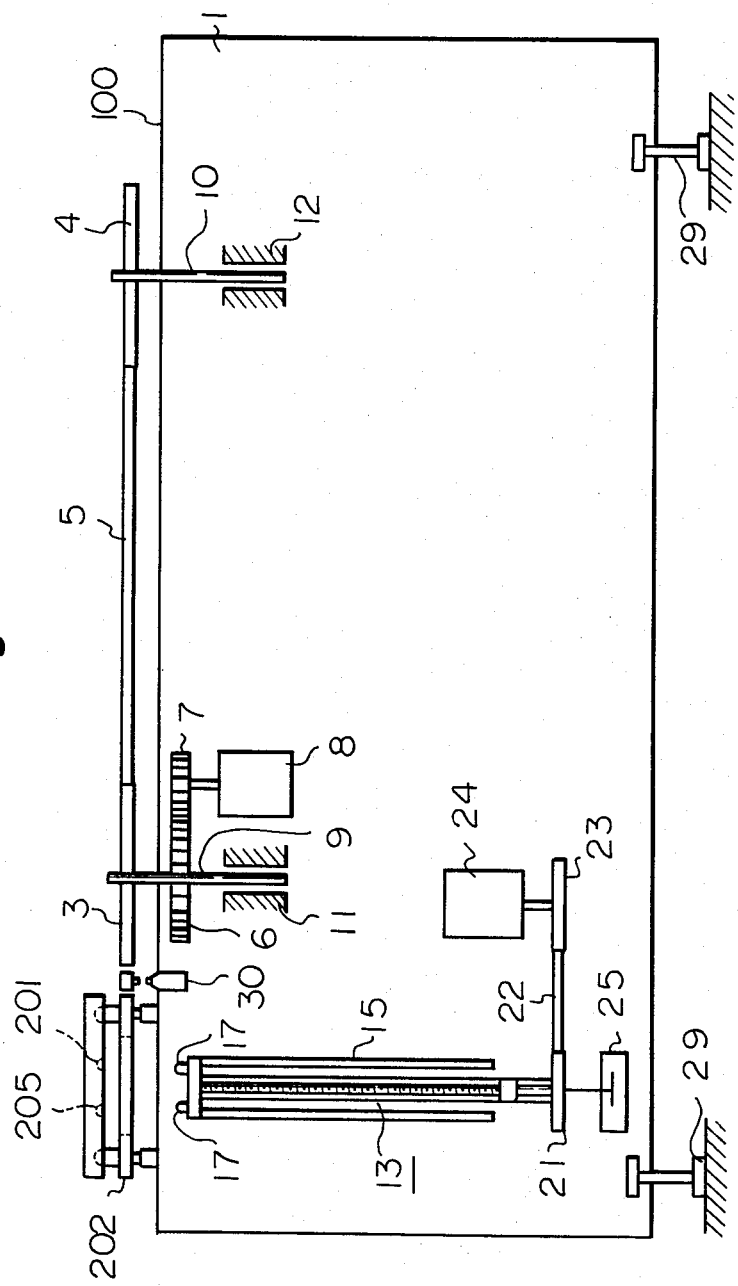
FIG. 6 is a front view of the workpiece feeder shown in FIG. 1.

In FIG. 1 and FIG. 6, reference numeral 1 is a frame of a rotary type workpiece feeder. A table 100 is mounted on the machine frame 1. Reference numeral 110 is a conveyor mounted on the table 100. The conveyor 110 comprises a pair of sprockets 3, 4 and a pallet-transferring chain 5 engaged with the sprockets 3, 4 and having a plurality of movable pallets 2 interspaced from each other at equal distances.

As shown in FIGS. 2 through 5, the workpiece carrying pallet 2 is composed of a combination of an upper plate 201 and a lower plate 202. On the diagonal corners of the bottom of the upper plate 201 are provided recesses 203 and 203. On the diagonal corners of the top of the lower plate 202 are provided projections 204 and 204. The upper plate 201 and the lower plate 202 are engaged together by inserting the projections 204, 204 into the recesses 203, 203.

In the center of the bottom of the upper plate 201 are provided two recesses 205, 205 corresponding to two projections 17, 17 provided at the top of a pallet-lifting means 13. At the center of the lower plate 202 is provided an opening 206 through which the pallet-lifting means 13 rises and descends. The lower plates 202 are attached to the pallet-transferring chain 5, but the upper plates 201 are not directly attached to the pallet-transferring chain 5. Reference numeral 6 is a gear fixed to a shaft 9 of the sprocket 3; reference numeral 7 is a gear engaged with the gear 6, reference numeral 8 is a motor; reference numeral 11 is a bearing; reference numeral 10 is a shaft of another sprocket 4; and reference numeral 12 is a bearing for the shaft 10. The rotation of the motor 8 is transmitted to the sprocket 3 via the gears 7, 6, moving the pallet-transferring chain 5 is to transfer the workpiece carrying pallets 2 to the predetermined position.

The pallet-lifting means as a whole is represented by reference numeral 13. Its detailed structure is shown in FIG. 7. A platform 14 is mounted on the top of the pallet-lifting means 13. Guide rods 15, 15 are extended downward from both sides of the platform 14, and a cylindrical body 18 is mounted downward on the center of the platform 14. A nut 19 is fixed on the lower end of the cylindrical body 18, and a lead screw 20 screwed in the nut 19 passes vertically through the cylindrical body 18. A pulley 21 is mounted on the lower part of the lead screw 20. The lower end of the lead screw 20 is connected with a brake 25. The lead screw 20 is supported to be able to rotate, but not to be able to move up or down (not shown in the drawings).

A timing belt 22 is engaged with the pulley 21. The timing belt 22 is also engaged with a pulley 23 rotated by a electric motor 24.

Two projections 17, 17 are provided on the top of the platform 14.

The projections 17, 17 can be inserted into the recesses 205, 205 provided at the center of the bottom of the upper plate 201. The guide rods 15, 15 are guided up and down, respectively, by guides 16, 16 which are mounted in the frame 1.

Figure 8:
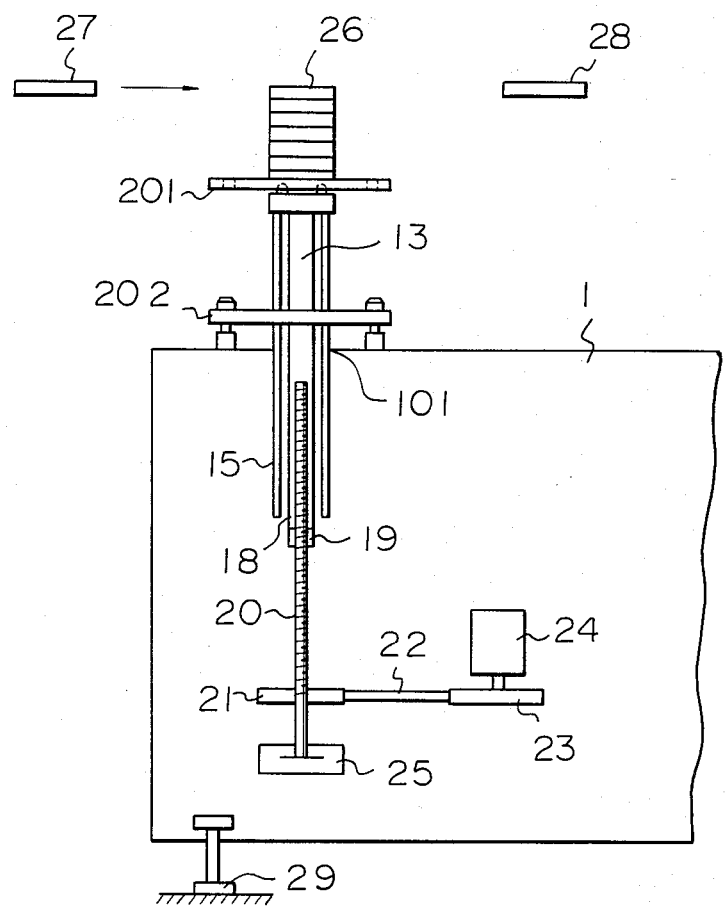
FIG. 8 is a front view of the main part of the lifting means lifted in the workpiece feeder shown in FIG. 6.

In FIG. 8, reference numerals 26 are workpieces stacked up on the top of the upper plate 201. Reference numeral 27 is a light source, and reference numeral 28 is a light receiving bulb, the two of them constituting a sensor which detects the position of the workpieces. Reference numeral 101 is a window bored in the table 100.

In FIG. 6, reference numeral 29 is a supporting leg of the machine frame 1, and reference numeral 30 is a limit switch which decides the stop position of the pallet 2.

The function of the workpiece feeder according to above-mentioned constitution will be explained below.

The pallet-transferring chain 5 is driven by motor 8 and stops at a predetermined position by the operation of the position-setting limit switch 30. Then, the electric motor 24 rotates. The rotation of the electric motor 24 is transmitted to the lead screw 20 via the pulley 23, the timing belt 22, and the pulley 21. Since the lead screw 20 is supported to be able to rotate at a constant position, this rotation causes the nut 19 screwed over the lead screw 20 to rise. The cylindrical body 18 on which lower end the nut 19 is mounted thus also rises, the guide rods 15, 15 rising together with the cylinderical body 18 through the guides 16, 16. As a result, platform 14 rises and passes through the window 101 in the table 100 and the opening 206 in the lower plate 202, and the projections 17, 17 are inserted into the recesses 205, 205 provided at the bottom of the upper plate 201. Depending on how far the platform 14 is raised, the upper plate 201 and workpieces 26 stacked on it are lifted as shown in FIG. 8.

When the upper ends of the stacked workpieces 26 reach the level of the light source 27 and light receiving bulb 28, the light beam between the two is broken, causing the electric motor 24 to stop and causing the lead screw 20 to stop rotating instantly by brake 25, whereby the upper plate 201 stops rising.

Thus, if the light source 27 and light receiving bulb 28 are preset to a level corresponding to the position of the workpiece gripping position of the hand of the robot, the required workpieces can be effectively transferred to the position of the workpiece gripping position of the hand of the robot.

The light source 27 and light receiving bulb 28, i.e., the sensor, do not have to be separately attached units, but can also be attached to the hand of the robot itself.

Figure 9:
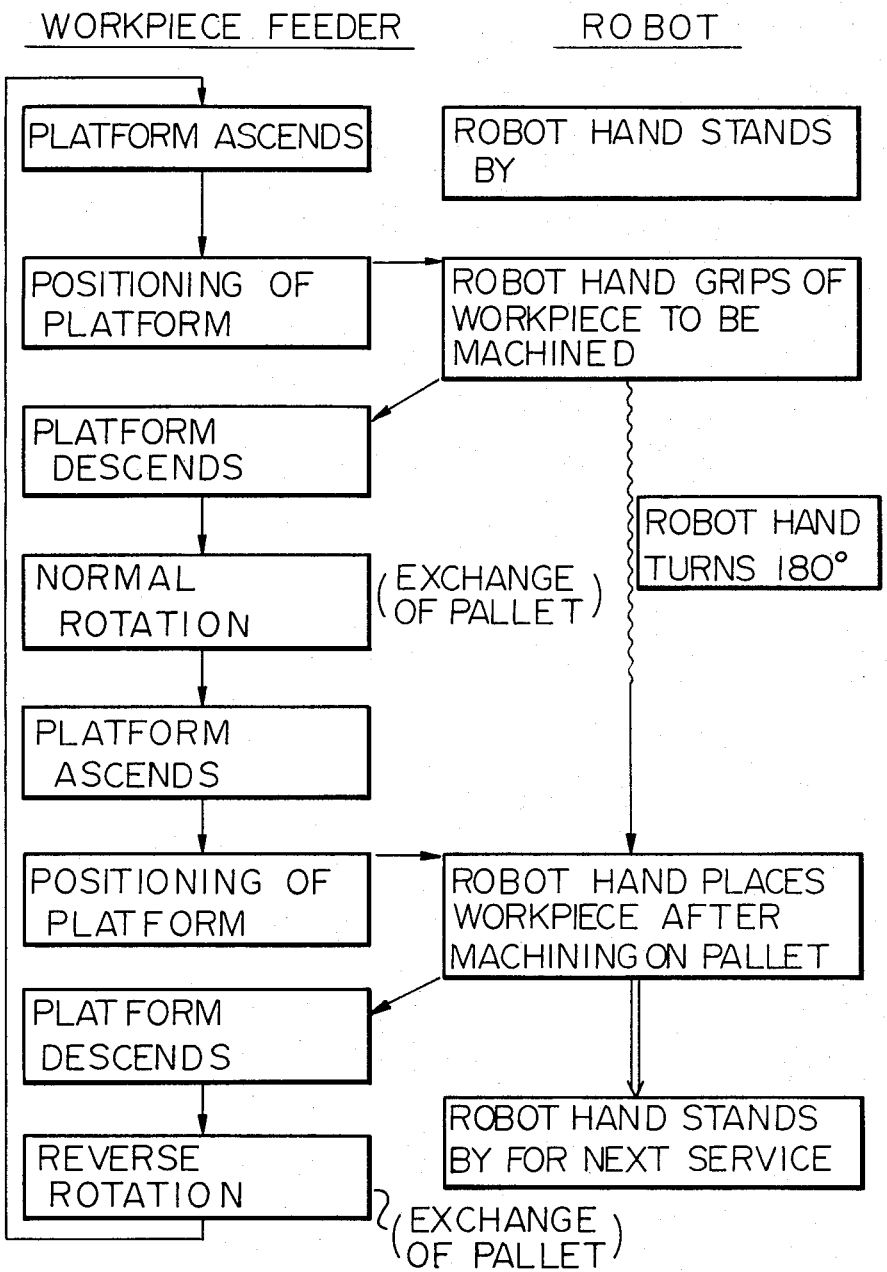
FIG. 9 is a flow chart of the change of a workpiece in the workpiece feeder according to the present invention.

The workpiece-changing sequence in a workpiece feeder according to the present invention is shown in FIG. 9. According to the present invention, the workpiece changing sequence can be achieved by two methods, as follows.

(1) Prior incorporation of the workpiece feeding sequence into the operating program of the robot, provision of an actuator, a sensor, etc. at the workpiece feeder, and direct linkage of the workpiece feeder to the robot, for direct control by the robot.

(2) Incorporation of a simple sequence controller in the workpiece feeder and use of workpiece feed commands to effect sequence operations built in the sequence controller.

For the control means of workpiece feed, in addiiton to the use of a motor and determination of position by a sensor, as in the aforementioned embodiment, it is also possible to adopt a D.C. servomechanism for control. In this case, no sensor is necessary, since the position of the workpiece can be instructed.

Although a rotary type workpiece feeder has been described in the embodiment in the drawings, the present invention can also be applied to linear movement type workpiece feeders.

We claim:

1. An apparatus for successively feeding workpieces to a workpiece gripping position of a hand of an industrial robot, comprising:

a frame;

a table mounted on said frame;

an endless conveyor mounted on said table and having a plurality of movable pallets interspaced from each other at equal distances, each of said pallets having a lower plate and an upper plate detachably mounted on said lower plate, said lower plate having a central opening and two projections, said upper plate having two recesses corresponding to said projections, or vice versa, said projections and recesses being disposed on corresponding diagonal corners of said upper and lower plates, said plates being coupled together by fitting said projections into said recesses, said conveyor having at least one belt run portion extending over said table such that said pallets are intermittently moved one by one under said workpiece gripping position;

a window disposed in said table and aligned with said workpiece gripping position; and a lifting means movable vertically through said window in the table and said central opening in the lower plate of a pallet to engage the upper plate of the same pallet from below, causing said upper plate to move and to lift a workpiece placed on said upper plate up to said workpiece gripping position, said lifting means comprising a lead screw provided rotatively on the machine frame, an electric motor rotating said lead screw normally and reversely, a nut screwed on said lead screw, a nonrotatable cylindrical body on which said nut is fixed, and a platform mounted on the top of said cylindrical body and led by a guide means provided on the machine frame, the top of said platform and the bottom of each of said upper plates having cooperative engaging means.

2. An apparatus for successively feeding workpieces according to claim 1, wherein said engaging means is composed of projections provided on the top of said platform and recesses corresponding to said projections provided on the bottom of said upper plate, or vice versa.

3. An apparatus for successively feeding workpieces according to claim 1, wherein said electric motor is a D.C. servomotor controlled according to a predetermined program.

4. An apparatus for successively feeding workpieces according to claim 1, further comprising a means sensing the upper ends of a plurality of workpieces stacked up on the pallet, signals from said sensing means stopping the rising motion of said lifting means, whereby a plurality of workpieces stacked up on the pallet are transferred one by one to the workpiece gripping position.

5. An apparatus for successively feeding workpieces according to any one of claims 1-4, wherein said lifting means has a brake.

* * * * *